(12) United States Patent
Ino

(10) Patent No.: US 7,246,592 B2
(45) Date of Patent: Jul. 24, 2007

(54) INTAKE MANIFOLD FOR INTERNAL COMBUSTION ENGINE

(75) Inventor: Masao Ino, Toyota (JP)

(73) Assignee: Denso Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/593,034

(22) Filed: Nov. 6, 2006

(65) Prior Publication Data
US 2007/0101963 A1 May 10, 2007

(30) Foreign Application Priority Data
Nov. 7, 2005 (JP) ............................. 2005-322019

(51) Int. Cl.
*F02M 35/10* (2006.01)
*F02M 35/116* (2006.01)

(52) U.S. Cl. ............................. 123/184.55; 123/184.34

(58) Field of Classification Search ........... 123/184.21, 123/184.31, 184.34, 184.36, 184.47, 184.48, 123/184.49, 184.51, 184.53, 184.55
See application file for complete search history.

(56) References Cited
U.S. PATENT DOCUMENTS
6,725,822 B2 * 4/2004 Matsumoto et al. ... 123/184.34
6,997,157 B2    2/2006 Ikuma et al.
7,011,064 B2 *  3/2006 Kito et al. ............. 123/184.42
2006/0005798 A1 * 1/2006 Chu ....................... 123/184.55

* cited by examiner

Primary Examiner—Hai Huynh
(74) Attorney, Agent, or Firm—Nixon & Vanderhye P.C.

(57) ABSTRACT

An intake manifold is provided to an internal combustion engine including a first and second cylinder heads each having an intake port. The first and second cylinder heads are distant from each other, and defining a crank angle therebetween. The intake manifold includes a manifold body that defines intake passages each connecting with each intake port. Each intake passage has an interior divided into divisional passages. A butterfly valve communicates and blocks at least one of the divisional passages. Tanks are formed integrally with the manifold body for accumulating negative pressure in the manifold body. The tanks include a first tank, which is provided to the first cylinder head, and a second tank, which is provided to the second cylinder head. An actuator operates the butterfly valve by being applied with negative pressure from the plurality of tanks. The manifold body has a communication passage that communicates the first tank with the second tank.

7 Claims, 10 Drawing Sheets

INTAKE MANIFOLD FOR INTERNAL COMBUSTION ENGINE

CROSS REFERENCE TO RELATED APPLICATIONS

This application is based on and incorporates herein by reference Japanese Patent Application No. 2005-322019 filed on Nov. 7, 2005.

FIELD OF THE INVENTION

The present invention relates to an intake manifold for an internal combustion engine.

BACKGROUND OF THE INVENTION

An intake manifold has a negative pressure tank, which accumulates negative pressure generated in the intake manifold. The negative pressure in the negative pressure tank is applied to a butterfly valve apparatus for communicating and blocking a passage in the intake manifold.

According to U.S. Pat. No. 6,997,157 (JP-A-2005-2942), for example, a negative pressure tank is provided to a space around an intake manifold, thereby sufficiently securing a volume of the negative pressure tank. In this structure, the negative pressure tank can be located in the vicinity of the intake manifold, so that the intake manifold can be formed integrally with the negative pressure tank. Thus, the number of components of the intake manifold can be restricted.

However, in an intake manifold used for an engine such as V-type engine, it is difficult to secure a space sufficiently for accommodating a negative pressure tank having a large volume around the manifold. When a negative pressure tank is not formed integrally with an intake manifold, and the negative pressure tank is distant from the intake manifold, components for constructing the negative pressure tank and for communicating the negative pressure tank with the intake manifold need to be additionally provided. As a result, the number of components increases.

SUMMARY OF THE INVENTION

The present invention addresses the above disadvantage. According to one aspect of the present invention, an intake manifold is provided to an internal combustion engine including a first cylinder head and a second cylinder head each having at least one intake port. The first cylinder head and the second cylinder head define a crank angle therebetween. The intake manifold includes a manifold body that defines a plurality of intake passages each connecting with each of the at least one intake port. Each of the plurality of intake passages has an interior divided into a plurality of divisional passages. The intake manifold further includes a butterfly valve that communicates and blocks at least one of the plurality of divisional passages. The intake manifold further includes a plurality of tanks that is formed integrally with the manifold body for accumulating negative pressure generated in the manifold body. The plurality of tanks includes a first tank and a second tank, which are provided respectively to the first cylinder head and the second cylinder head. The intake manifold further includes an actuator that is applied with negative pressure from the plurality of tanks for operating the butterfly valve. The manifold body has a communication passage that communicates the first tank with the second tank.

According to another aspect of the present invention, an intake manifold is provided to an internal combustion engine including a first cylinder head and a second cylinder head defining a crank angle therebetween. Each of the first cylinder head and the second cylinder head has at least one intake port. The intake manifold includes a first member. The intake manifold further includes a second member that connects with the first member and partially defines a plurality of intake passages, each connecting with each intake port, therebetween. The first member and the second member define a first chamber, a second chamber, and a communication passage therebetween for accumulating negative pressure generated in the plurality of intake passages. The first chamber and the second chamber are provided respectively to the first cylinder head and the second cylinder head. The communication passage communicates the first tank with the second tank. The first tank and the second tank interpose the communication passage therebetween.

According to another aspect of the present invention, an intake manifold is provided to an internal combustion engine including a first cylinder head and a second cylinder head each having at least one intake port. The first cylinder head and the second cylinder head define a crank angle therebetween. The intake manifold includes a manifold body that includes a first member and a second member connecting with each other and internally defining a plurality of intake passages each connecting with each intake port. The first member and the second member define a first chamber, a second chamber, and a communication passage therebetween for accumulating negative pressure generated in the plurality of intake passages. The first chamber and the second chamber are provided respectively to the first cylinder head and the second cylinder head. The communication passage communicates the first tank with the second tank. Each of the plurality of intake passages having an interior divided into a plurality of divisional passages. The intake manifold further includes a butterfly valve that communicates and blocks at least one of the plurality of divisional passages. The intake manifold further includes an actuator that is applied with negative pressure from the first chamber and the second chamber for operating the butterfly valve.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1A:
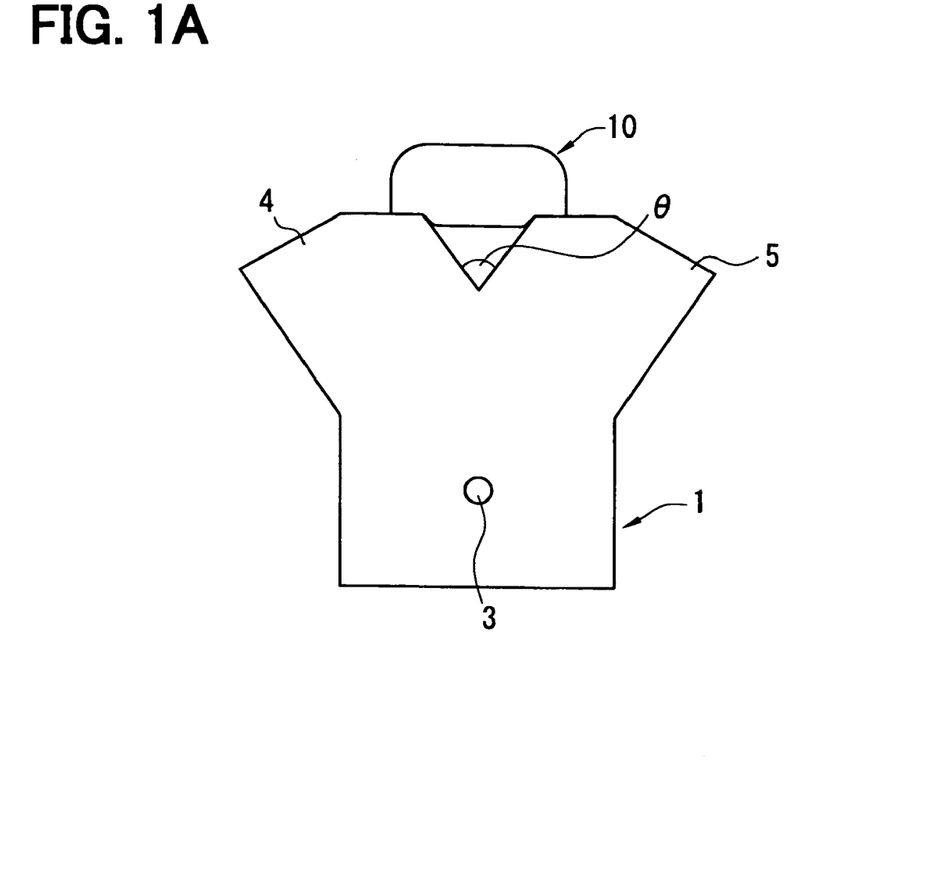
FIG. 1A is a front view showing an engine and an intake manifold when being viewed perpendicularly from a crankshaft.
Figure 1B:
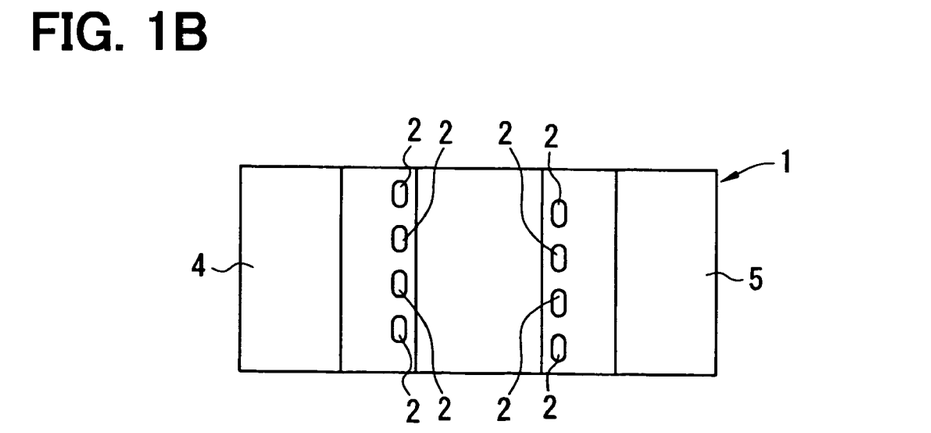
FIG. 1B is a top view showing the engine and the intake manifold.

As shown in FIGS. 1A, 1B, an internal combustion engine 1 for a vehicle connects with an intake manifold 10. In this example, the engine 1 is an eight-cylinder engine having a first and second cylinder heads 4, 5. Each of the first and second cylinder heads 4, 5 has four intake ports 2 that are arranged substantially along the axial direction of a crankshaft 3. The cylinder heads 4, 5 are distant from each other, and are defining a crank angle therebetween. In this example, the engine 1 is a v-type engine in which the first and second cylinder heads 4, 5 are opposed to each other, and are defining a bank angle θ therebetween.

Figure 2:
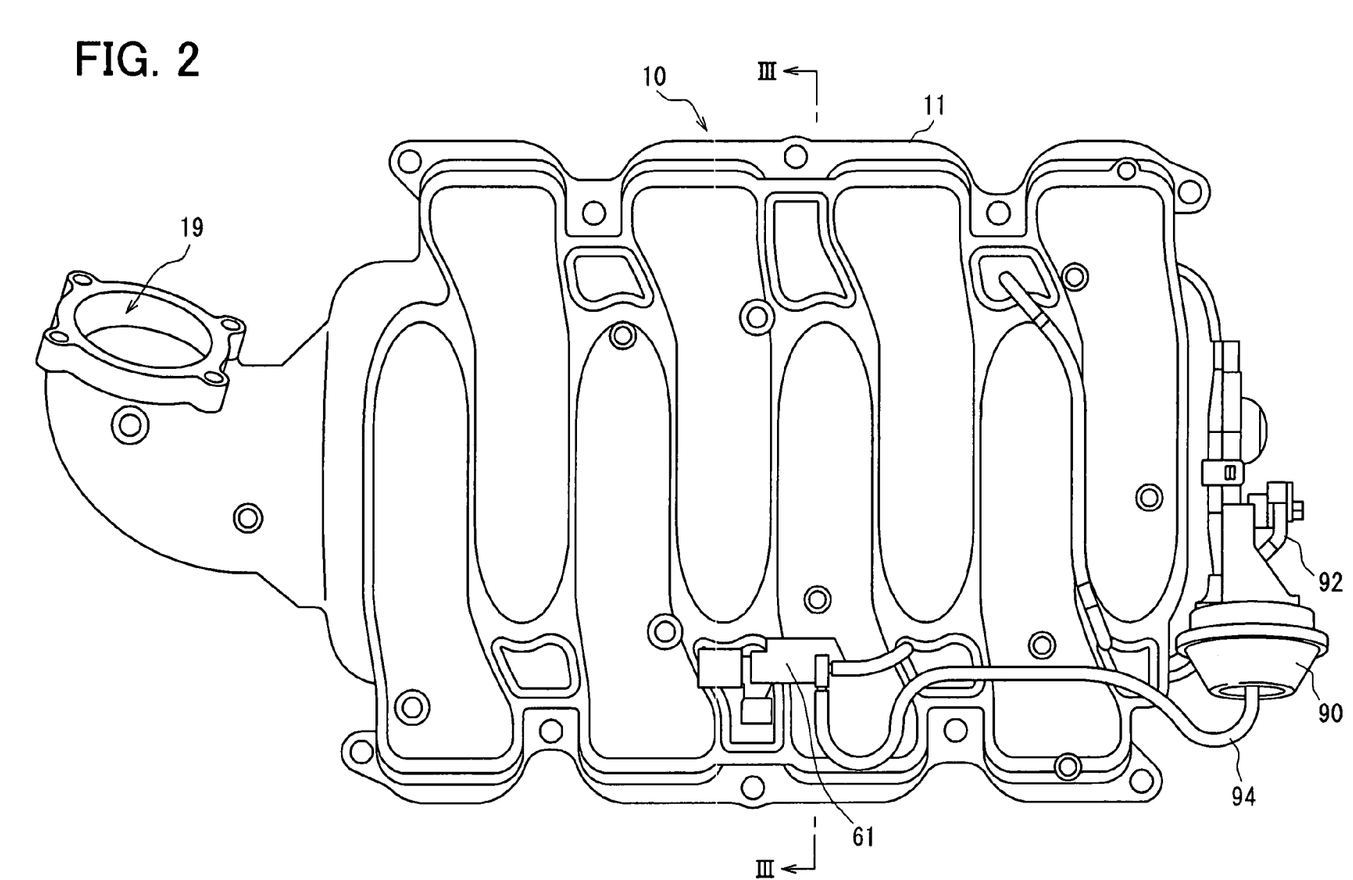
FIG. 2 is a top view showing the intake manifold.
Figure 3:
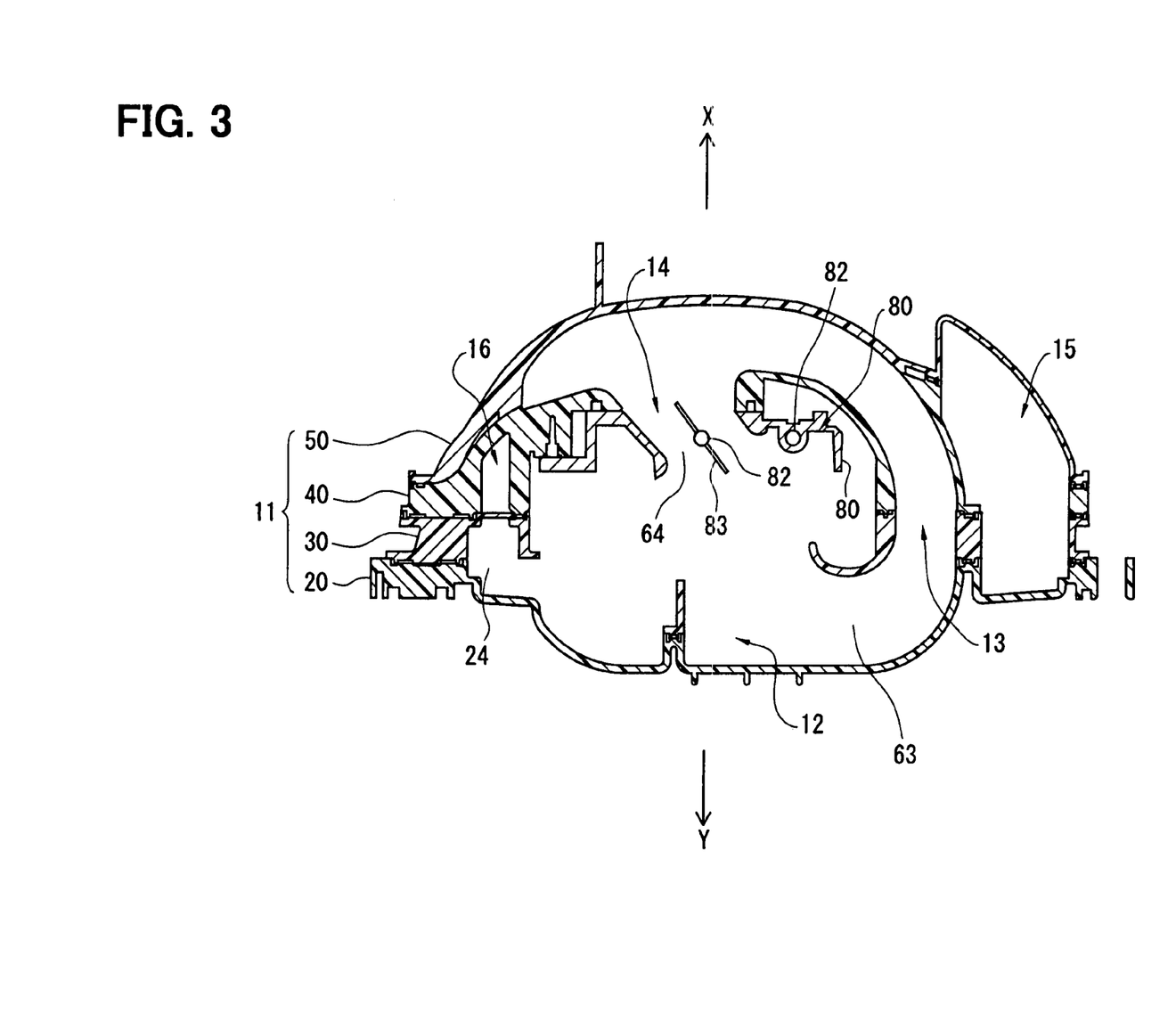
FIG. 3 is a sectional view showing the intake manifold.

As shown in FIGS. 2, 3, the intake manifold 10 includes a manifold body 11, negative pressure tanks 15, 16, a butterfly valve device 80, a three-way solenoid valve 61, and a diaphragm actuator 90. The diaphragm actuator 90 serves as a negative pressure actuator.

The manifold body 11 is formed of resin. The manifold body 11 has an inlet passage 19, a surge tank 12, low speed passages 13, and high speed passages 14. The inlet passage 19 communicates an air cleaner (not shown) with the surge tank 12. The surge tank 12 has a generally large volume. Intake air is filtered through the air cleaner, and the filtered intake air flows into the surge tank 12 through the inlet passage 19.

Eight of the low speed passages 13 and eight of the high speed passages 14 are provided to the engine 1 corresponding to the number of the cylinders of the engine 1. Each of the low speed passages 13 has an upstream end 63 on the upstream side thereof. The upstream end 63 communicates with the surge tank 12. Each of the low speed passages 13 has a downstream end on the downstream side thereof. The downstream end of the low speed passage 13 connects with the corresponding one of the four intake ports 2 in the engine 1. Each of the high speed passages 14 has an upstream end 64 on the upstream side thereof. The upstream end 64 communicates with the surge tank 12. Each of the high speed passages 14 has a downstream end on the downstream side thereof. The downstream end of the high speed passage 14 communicates with an intermediate portion of the corresponding one of the low speed passages 13. In this example, the low speed passages 13 and the high speed passages 14 define an intake passage. Each low speed passage 13 or each high speed passage 14 serve as a divisional passage in the intake passage.

Figure 4:
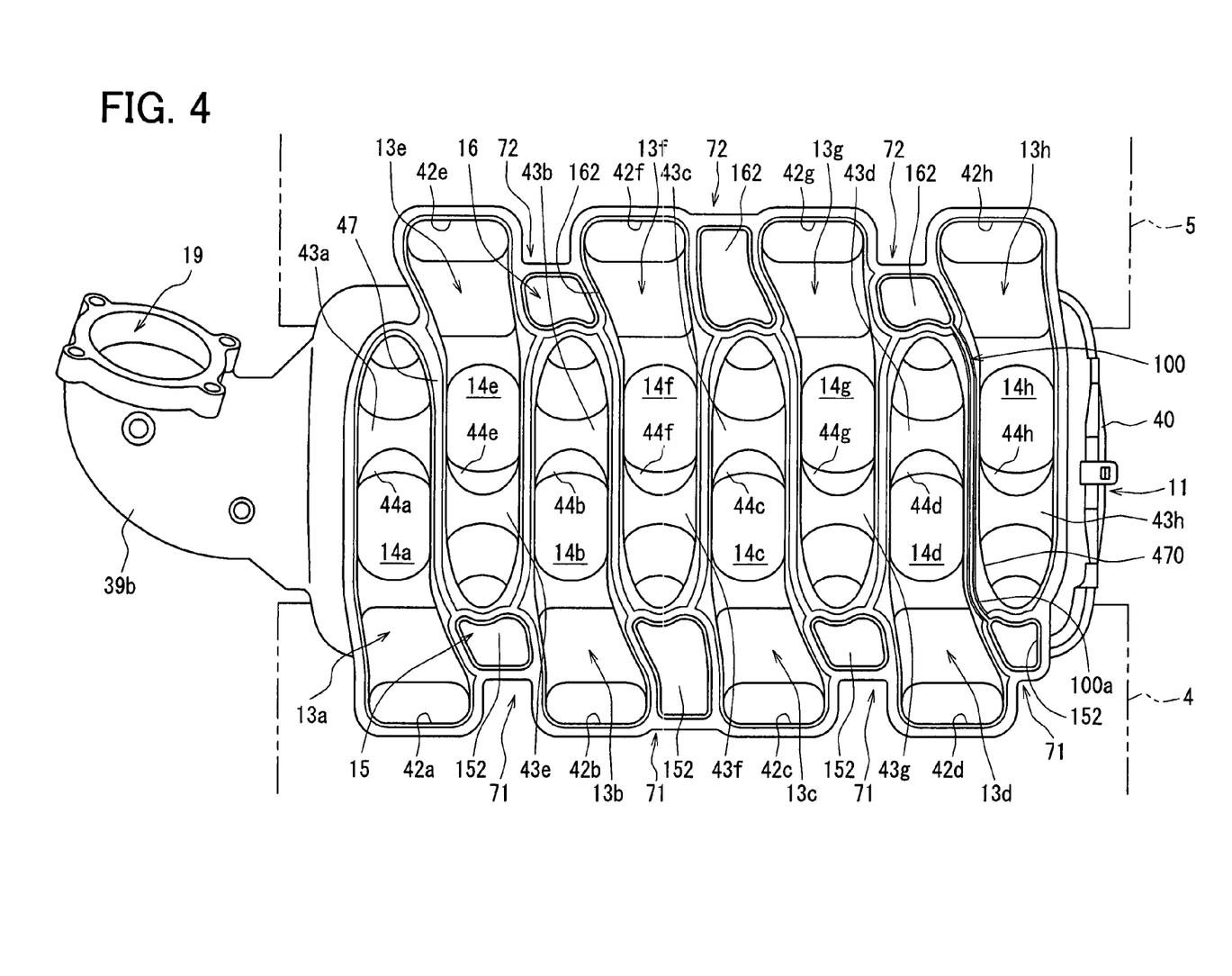
FIG. 4 is a top view showing an intermediate member of an intake manifold.

As shown in FIGS. 3, 4, the manifold body 11 is formed of resin integrally with the first negative pressure tank 15 and the second negative pressure tank 16. Each of the first and second negative pressure tanks 15, 16 has a predetermined volume. The first and second negative pressure tanks 15, 16 communicate with each other. The first negative pressure tank 15 is located on the side of the first cylinder head 4 in the manifold body 11. The second negative pressure tank 16 is located on the side of the second cylinder head 5 in the manifold body 11. In this structure, the first and second negative pressure tanks 15, 16 are located on both sides of the manifold body 11 such that the first and second negative pressure tanks 15, 16 interpose the manifold body 11 therebetween.

As shown in FIG. 3, the butterfly valve device 80 is assembled to the manifold body 11. The butterfly valve device 80 includes two valve shafts 82 and eight valve bodies 83. The four high speed passages 14 communicate respectively with the four intake ports 2 (FIG. 1B) of the first cylinder head 4 respectively through the low speed passages 13. One of the two valve shafts 82 are provided across the four high speed passages 14. This valve shaft 82 is rotatable in the four high speed passages 14. The four high speed passages 14 communicate respectively with the four intake ports 2 (FIG. 1B) of the second cylinder head 5 respectively through the low speed passages 13. The other of the two valve shafts 82 is provided across the four high speed passages 14. This valve shaft 82 is rotatable in the four high speed passages 14. Each of the eight valve bodies 83 is in a substantially disc-shape. The valve bodies 83 are provided correspondingly to the high speed passages 14. The valve bodies 83 are rotatable integrally with the valve shaft 82 passing through the high speed passages 14. Thus, in this structure, the high speed passages 14 are opened and closed by rotating the valve bodies 83 together with the valve shaft 82.

As shown in FIG. 2, the three-way solenoid valve 61 is assembled to the manifold body 11. The three-way solenoid valve 61 selectively applies one of negative pressure in the first negative pressure tank 15 and atmospheric pressure to a negative pressure chamber of the diaphragm actuator 90.

The diaphragm actuator 90 has a generally known structure, which is operated by negative pressure. The diaphragm actuator 90 includes a negative pressure chamber, a diaphragm, a compression spring (none shown), and the like. The compression spring biases the diaphragm. The diaphragm of the diaphragm actuator 90 connects with one end of each valve shaft 82 via a link mechanism 92 in the butterfly valve device 80. This diaphragm resiliently deforms corresponding to balance between negative pressure applied to the negative pressure chamber and bias force of the compression spring in the diaphragm actuator 90. The negative pressure applied to the negative pressure chamber is transmitted from the first negative pressure tank 15 through a supply pipe 94. The link mechanism 92 is operated by the resilient deformation of the diaphragm in the diaphragm actuator 90, so that the diaphragm actuator 90 rotates each valve shaft 82.

Next, the intake manifold 10 is further described in detail. In the following description, as referred to FIG. 4, each of low speed passages 13a to 13h denotes each of the above low speed passages 13, and each of high speed passages 14a to 14h denotes each of the above high speed passages 14. In the following description, the direction X depicted in FIG. 3 is defined as the upper direction, and the direction Y depicted in FIG. 3 is defined as the lower direction.

As referred to FIG. 4, each of the low speed passages 13a to 13d communicates with corresponding one of the four intake ports 2 of the first cylinder head 4. Each of the low speed passages 13e to 13h communicates with corresponding one of the four intake ports 2 of the second cylinder head 5. The low speed passages 13a to 13d and the low speed passages 13e to 13h are alternately arranged in the manifold body 11. Two of the low speed passages 13a to 13d, which are adjacent to each other, define a space 71 therebetween in the manifold body 11. Another space 71 is defined around the outer periphery of the low speed passage 13d on the right side in FIG. 4. A portion 152 of the first negative pressure tank 15 is located in the space 71, thereby being located around each intake port 2 of the first cylinder head 4. Two of the low speed passages 13e to 13h, which are adjacent to each other, define a space 72 therebetween in the manifold body 11. A portion 162 of the second negative pressure tank 16 is located in the space 72, thereby being located around each intake port 2 of the second cylinder head 5.

As referred to FIG. 3, the manifold body 11 and the first and second negative pressure tanks 15, 16 are constructed of four components including a first lower member 20, a second lower member 30, an intermediate member 40, and an upper member 50. The four components are formed of heat resistive resin such as polyamide resin and polypropylene resin. The four components are individually formed by injection molding, and are welded to each other in the order of the first lower member 20, the second lower member 30, the intermediate member 40, and the upper member 50.

Figure 5:
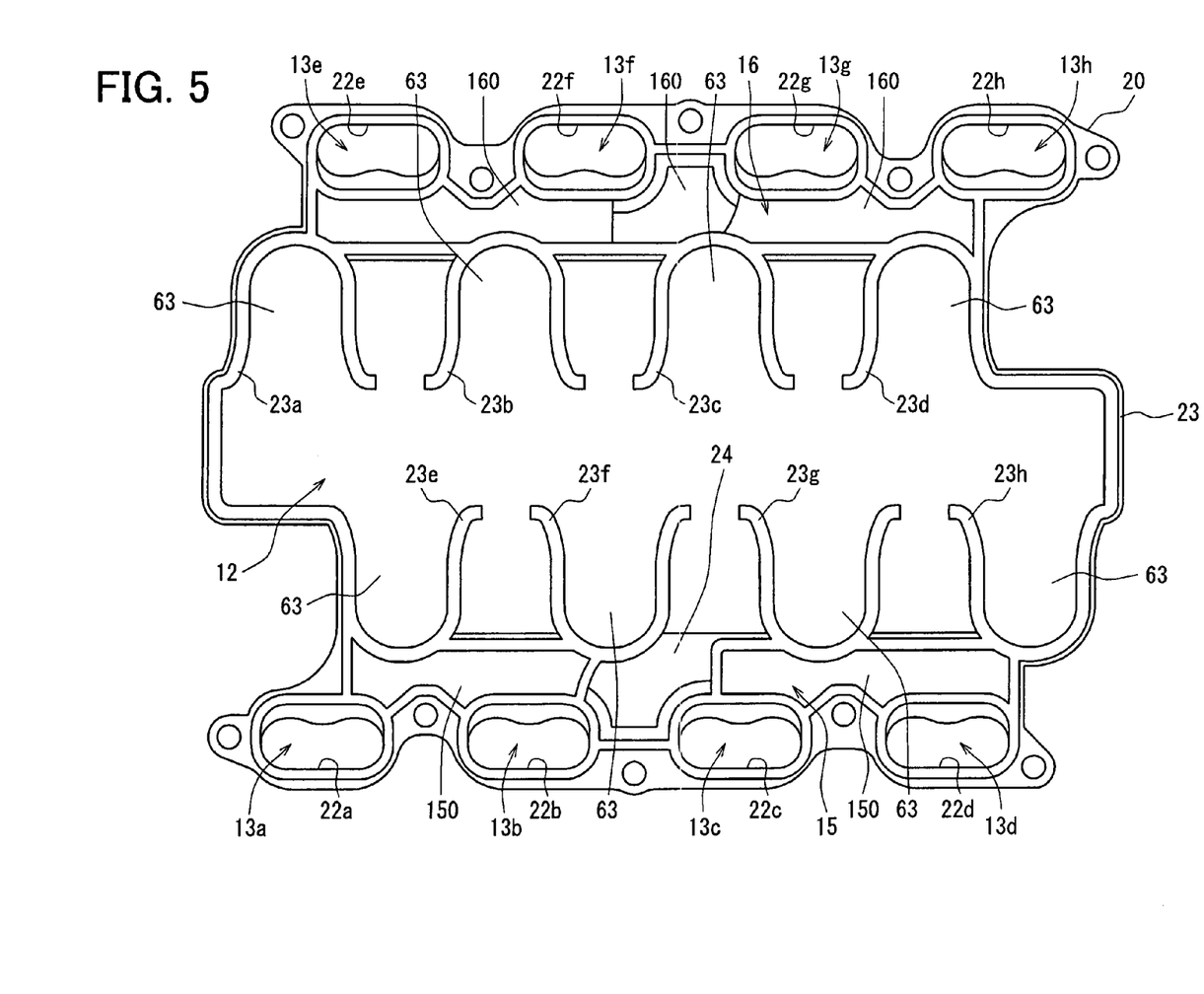
FIG. 5 is a top view showing a first lower member of the intake manifold.

As shown by the top view in FIG. 5, the first lower member 20 has four openings 22a to 22d and four openings 22e to 22h. The four openings 22a to 22d are located on one end side with respect to the short side of the first lower member 20. The four openings 22a to 22d are spaced from each other with respect to the longitudinal direction of the first lower member 20. The four openings 22e to 22h are located on the other end side with respect to the short side of the first lower member 20. The four openings 22e to 22h are spaced from each other with respect to the longitudinal direction of the first lower member 20. The four openings 22a to 22d define the low speed passages 13a to 13d on the side of the downstream ends. Each of the four openings 22a to 22d connects with each intake port 2 of the first cylinder head 4. The four openings 22e to 22h define the low speed passages 13e to 13h on the side of the downstream ends. Each of the four openings 22e to 22h connects with each intake port 2 of the second cylinder head 5.

The first lower member 20 further includes a partition wall 23 that partitions the surge tank 12, the openings 22a to 22h, the first and second negative pressure tanks 15, 16 from each other. The partition wall 23 partially defines lower walls 23a to 23h. Each of the lower walls 23a to 23h defines a lower portion of the upstream end 63 of each of the low speed passages 13a to 13h. The lower walls 23f, 23g define a passage 24 therebetween in the first lower member 20. Negative pressure in the surge tank 12 is applied to the first negative pressure tank 15 through the passage 24. The first negative pressure tank 15 is divided into two divisional passage portions 150 in the first lower member 20. The two divisional passage portions 150 interpose the passage 24 therebetween. The second negative pressure tank 16 is divided into three divisional passage portions 160 in the first lower member 20.

Figure 6:
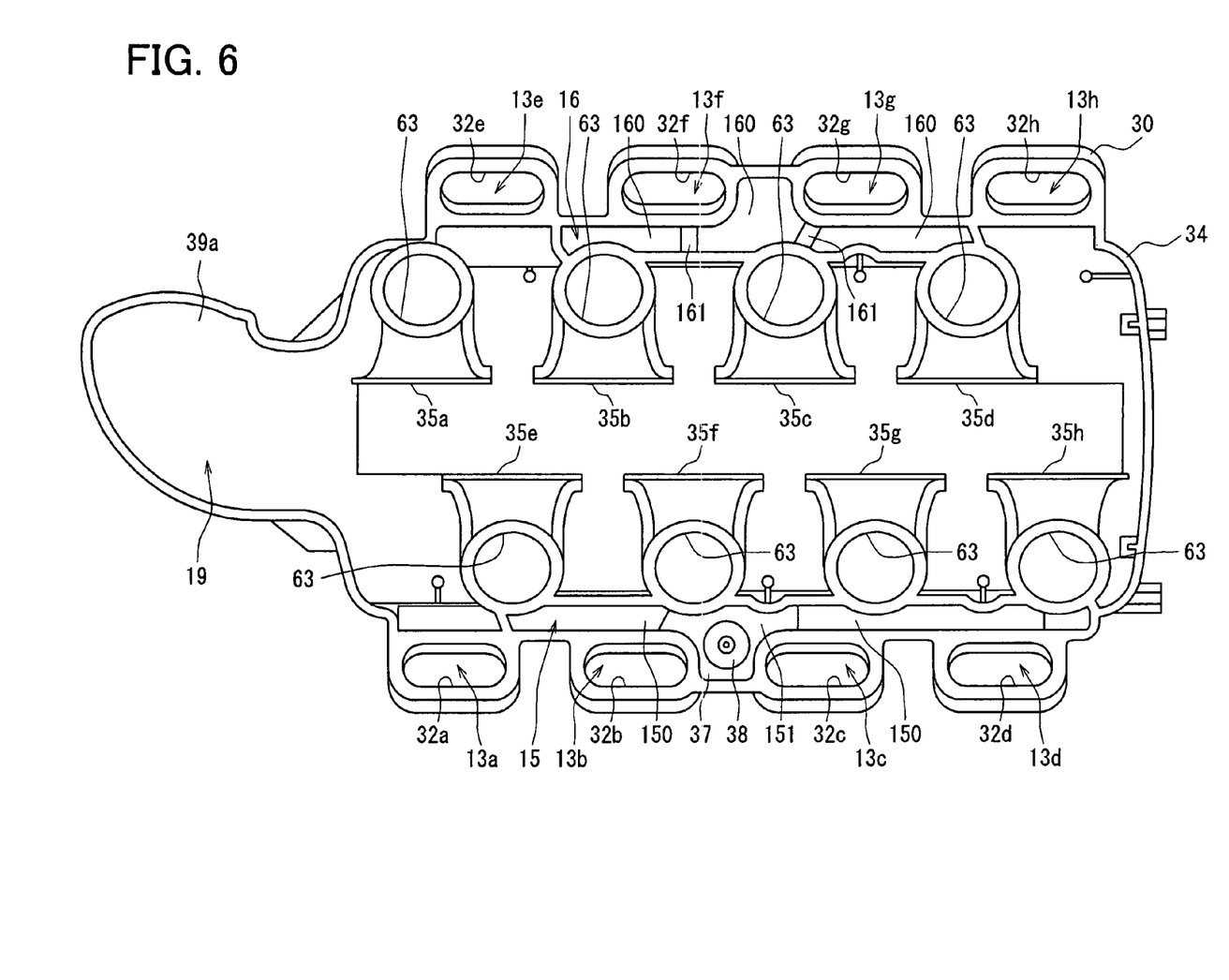
FIG. 6 is a top view showing a second lower member of the intake manifold.

As shown by the top view in FIG. 6, the second lower member 30 has eight openings 32a to 32h. Each of the openings 32a to 32h connects with corresponding one of the openings 22a to 22h of the first lower member 20. The openings 32a to 32h define the low speed passages 13a to 13h on the side of the downstream ends thereof. The second lower member 30 has upper walls 35a to 35h and a lower wall 39a. The upper walls 35a to 35h define the upstream ends 63 of the low speed passages 13a to 13h on the upper side thereof. The lower wall 39a defines the inlet passage 19 on the lower side thereof. The second lower member 30 further includes a partition wall 34 that partitions the surge tank 12, the openings 32a to 32h, the first and second negative pressure tanks 15, 16 from each other. The first negative pressure tank 15 is defined by connecting the divisional passage portions 150 (FIG. 5) with each other via a connecting portion 151 (FIG. 6) in the second lower member 30. The second negative pressure tank 16 is defined by connecting the divisional passage portions 160 with each other via connecting portions 161 in the second lower member 30.

The second lower member 30 further includes a support wall 37. The support wall 37 is interposed between the passage 24 (FIG. 5), which is defined by the first lower member 20, and a connecting portion of the first negative pressure tank 15. The support wall 37 supports a check valve 38. When the check valve 38 opens due to negative pressure in the surge tank 12, the negative pressure is applied from the surge tank 12 to the first negative pressure tank 15, so that the negative pressure is further applied from the surge tank 12 to the second negative pressure tank 16, which communicates with the first negative pressure tank 15. When the check valve 38 closes due to increase in pressure in the surge tank 12, the negative pressure is accumulated in the first and second negative pressure tanks 15, 16.

The intermediate member 40 shown in FIG. 4 has openings 42a to 42h. Each of the openings 42a to 42h connects with each of the openings 32a to 32h of the second lower member 30 (FIG. 6), thereby defining the low speed passages 13a to 13h on the downstream ends thereof. The intermediate member 40 includes lower walls 43a to 43h, passage walls 44a to 44h, and an upper wall 39b. The lower walls 43a to 43h define intermediate portions of the low speed passages 13 on the lower side thereof, and partition the surge tank 12. The passage walls 44a to 44h define the high speed passages 14a to 14h, and partition the surge tank 12. The upper wall 39b defines the inlet passage 19 on the upper side thereof.

The intermediate member 40 further includes a partition wall 47 that defines the low speed passages 13a to 13h, which are arranged with respect to the longitudinal direction of the intermediate member 40. The partition wall 47 partitions the low speed passages 13a to 13h. The partition wall 47 partially partitions the openings 42a to 42h and the first and second negative pressure tanks 15, 16. The first negative pressure tank 15 is divided into four divisional passage portions 152 in the intermediate member 40. The four divisional passage portions 152 are located in the space 71. The second negative pressure tank 16 is divided into three divisional passage portions 162 in the intermediate member 40. The three divisional passage portions 162 are located in the space 72.

Figure 7:
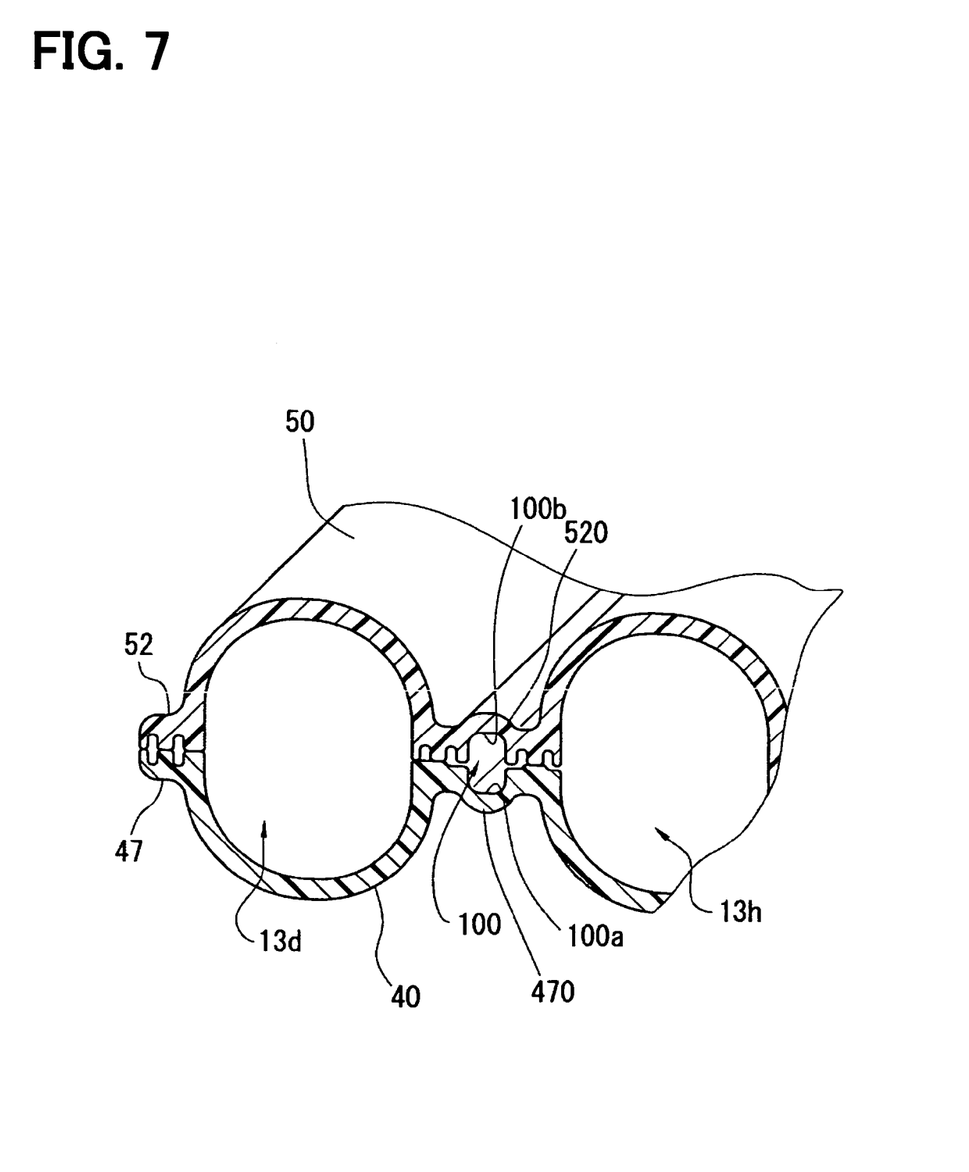
FIG. 7 is a sectional view showing the intake manifold.

As shown in FIGS. 4, 7, the partition wall 47 includes a portion 470 that partitions the low speed passage 13d from the low speed passage 13h in the intermediate member 40. The portion 470 of the partition wall 47 has a groove 100a.

Figure 8:
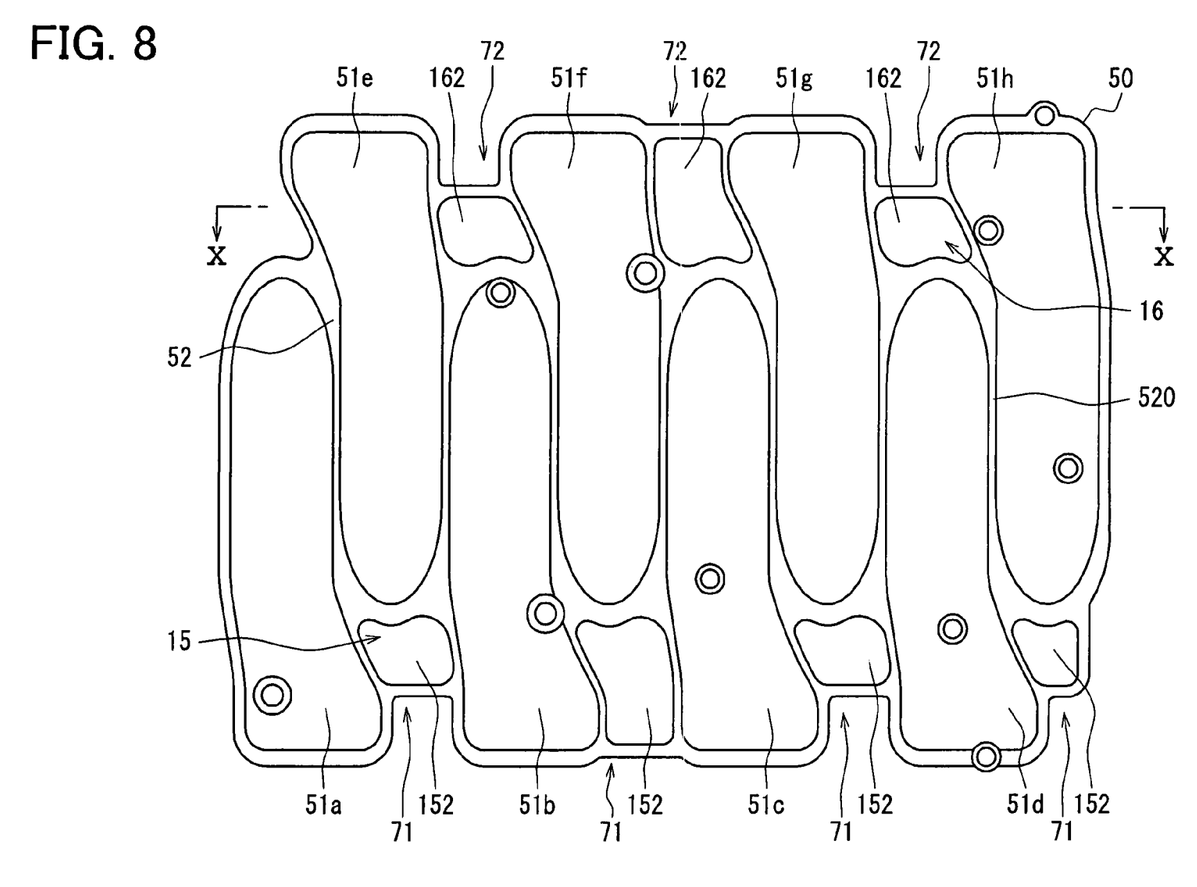
FIG. 8 is a top view showing an upper member of the intake manifold.
Figure 9:
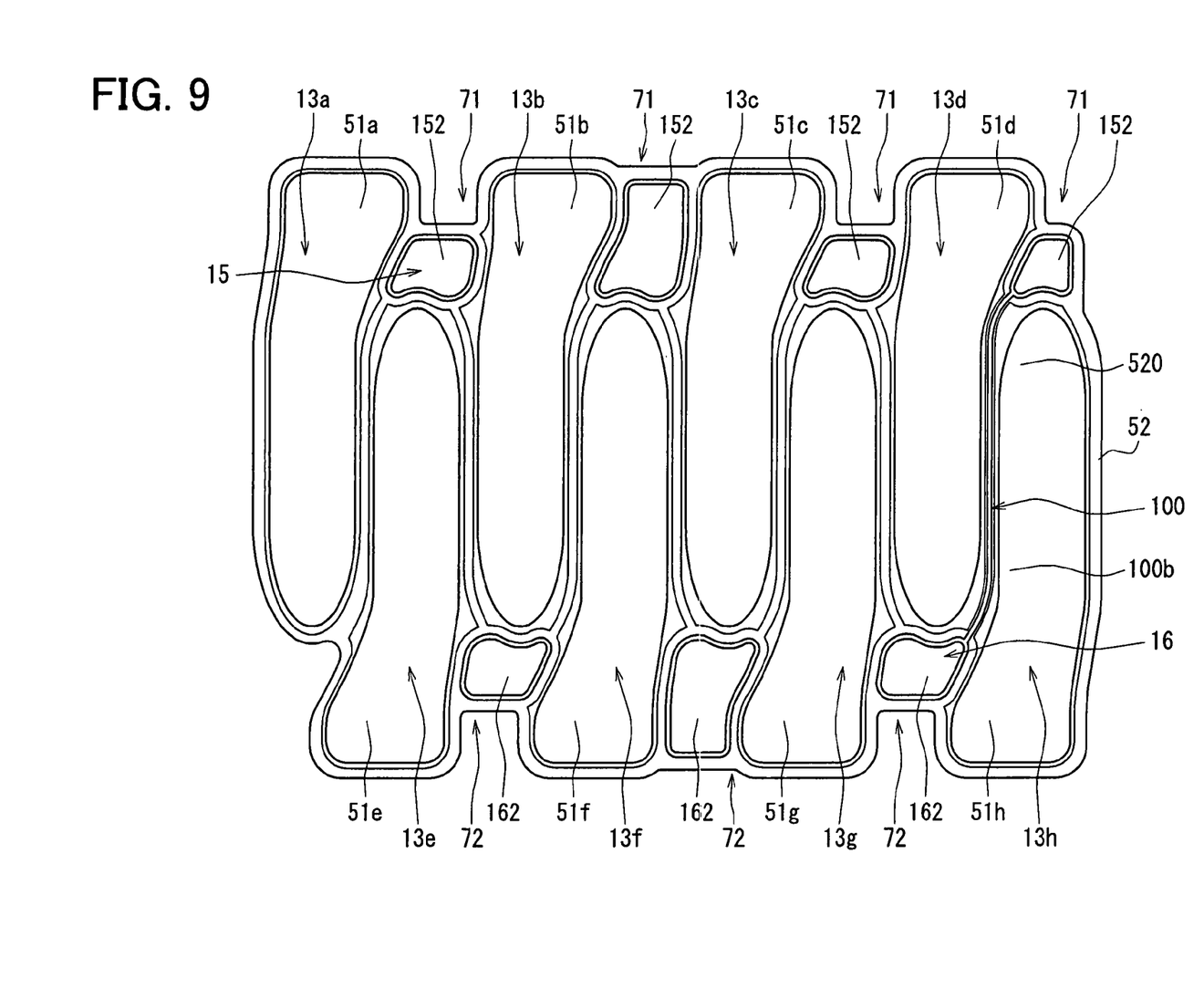
FIG. 9 is a bottom view showing a component of the intake manifold.
Figure 10:
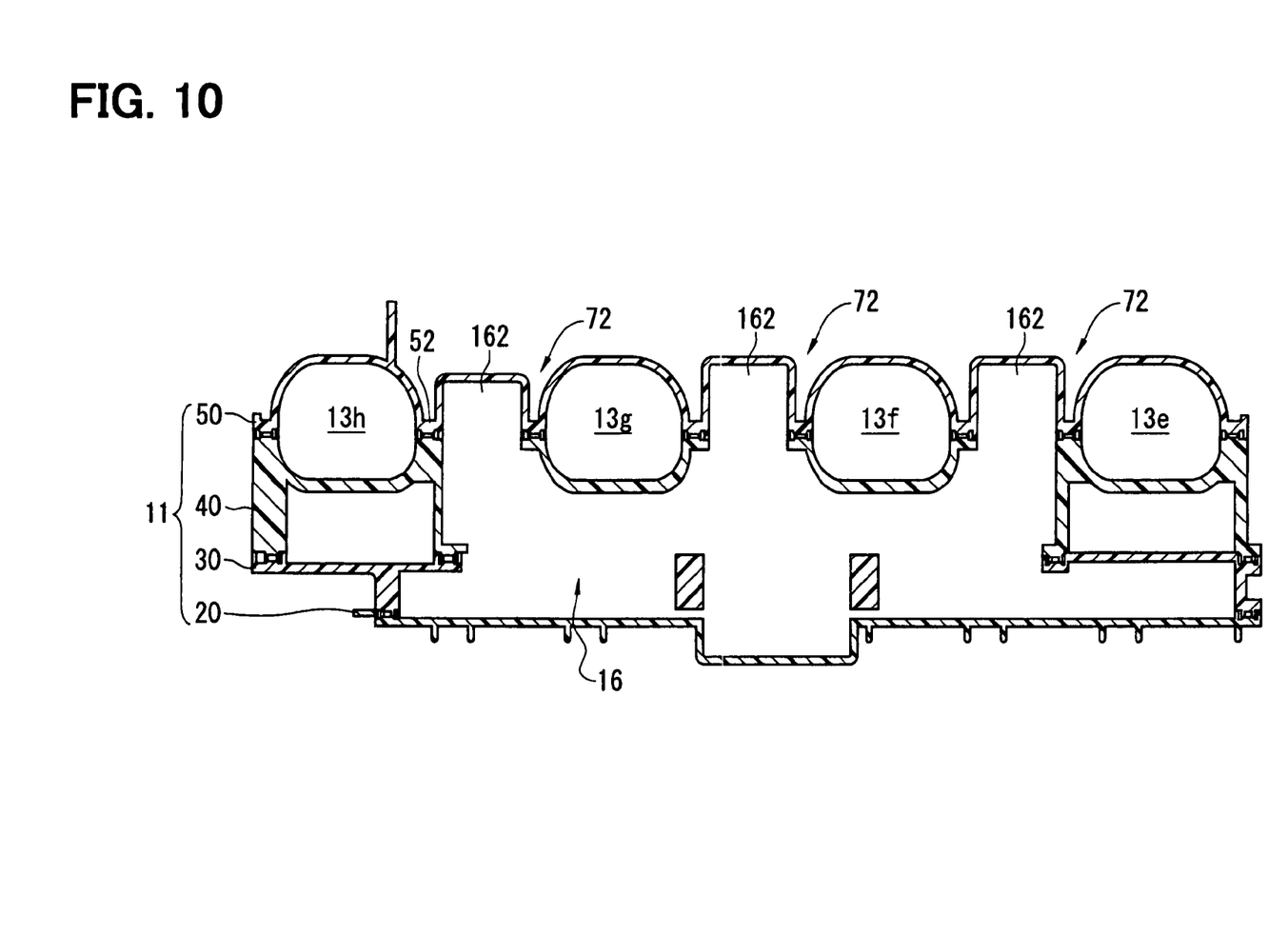
FIG. 10 is a schematic sectional view showing the intake manifold.

As shown in FIGS. 8, 9, the upper member 50 includes upper walls 51a to 51h that define the upper portions of intermediate portions of the low speed passages 13a to 13h. The upper member 50 further includes a partition wall 52 that is defined among the low speed passages 13a to 13h, which are arranged with respect to the longitudinal direction of the upper member 50. The partition wall 52 partitions the low speed passages 13a to 13h. The partition wall 52 partially partitions the first negative pressure tank 15 from the second negative pressure tank 16. The first and second negative pressure tanks 15, 16 are partitioned respectively into the four divisional passage portions 152 and the three divisional passage portions 162 in the upper member 50, similarly to the intermediate member 40. As shown in FIGS. 8 to 10, each of the divisional passage portions 152, 162 is arranged in the corresponding space 71, 72. Each of the divisional passage portions 152, 162 upwardly protrudes from the partition wall 52.

As shown in FIGS. 7, 9, the upper member 50 includes the partition wall 52 that has a portion 520 partitioning the low speed passage 13d from the low speed passage 13h. The portion 520 of the partition wall 52 has a groove 100b. As referred to FIG. 7, the portion 520 of the partition wall 52 of the upper member 50 connects with the portion 470 of the partition wall 47 of the intermediate member 40 in the manifold body 11, so that the groove 100b of the portion 520 of the partition wall 52 and the groove 100a of the portion 470 of the partition wall 47 define a communication passage 100 therebetween. In this structure, the communication passage 100 is defined in the boundary, via which the portion 520 of the partition wall 52 connects with the portion 470 of the partition wall 47. The communication passage 100 communicates the first negative pressure tank 15 with the second negative pressure tank 16. Thus, the first and second negative pressure tanks 15, 16 are jointly capable of accumulating negative pressure sufficiently for operating the diaphragm actuator 90.

As follows, an operation of the intake manifold 10 is described.

Negative pressure in the first and second negative pressure tanks 15, 16 is applied to the negative pressure chamber of the diaphragm actuator 90 through the three-way solenoid valve 61. The diaphragm is resiliently deformed by the negative pressure while compressing the compression spring, so that the diaphragm operates the link mechanism 92. Consequently, each valve shaft 82 is rotated, so that each valve body 83 communicates each high speed passage 14. Thus, intake air flowing into the surge tank 12 is supplied to each intake port 2 of the engine 1 through each high speed passage 14.

When pressure of intake air is applied to the negative pressure chamber of the diaphragm actuator 90 through the three-way solenoid valve 61, the diaphragm is resiliently deformed by the compression spring, so that the diaphragm operates the link mechanism 92. Consequently, each valve shaft 82 is rotated, so that each valve body 83 blocks each high speed passage 14. Thus, intake air flowing into the surge tank 12 is supplied to each intake port 2 of the engine 1 through each low speed passage 13 while bypassing each high speed passage 14.

In the above structure of the intake manifold 10, the first and second negative pressure tanks 15, 16 are individually provided respectively to the first and second cylinder heads 4, 5. The first and second negative pressure tanks 15, 16 communicate with each other through the communication passage 100. In this structure, even when space sufficiently for accommodating negative pressure tanks is not secured around the manifold body 11, the negative pressure tanks 15, 16 can be provided to the space 71, 72 and the like around the manifold body 11. Thus, the negative pressure tanks 15, 16 can be provided in the vicinity of the manifold body 11, so that the negative pressure tanks 15, 16 can be formed integrally with the manifold body 11. Therefore, the number of the components can be reduced.

In this structure of the intake manifold 10, the communication passage 100, which communicates the first and second negative pressure tanks 15, 16 with each other, is formed in the manifold body 11. Therefore, a component for communicating the first and second negative pressure tanks 15, 16 can be omitted from the intake manifold 10. In addition, as referred to FIG. 7, the intermediate member 40 and the upper member 50 constructing the manifold body 11 define the communication passage 100 in the boundary therebetween. The communication passage 100 is located between the low speed passages 13d, 13h. In this structure, the low speed passages 13d, 13h and the communication passage 100 can be defined by connecting the intermediate member 40 with the upper member 50. Thus, the low speed passages 13d, 13h and the communication passage 100 can be readily defined.

Thus, in this structure of the intake manifold 10, even when sufficient space is not secured around the manifold body 11, the negative pressure tanks 15, 16 can be defined while reducing the number of components, so that manpower and cost for manufacturing the intake manifold 10 can be reduced.

In the above structure, a space is defined between the intake passages connected with the intake ports of the same cylinder head. The negative pressure tanks can be at least partially located in the space, so that the intake manifold can be downsized. Thus, the intake manifold can be freely arranged.

For example, the engine 1 is not limited to a V-type engine. The engine may be a horizontally-opposed engine. That is, the above structure can be applied to any other engines, in which a pair of cylinder heads is distant from each other with respect to the crank angle.

The number of the intake ports 2 of the engine 1 is not limited to eight. The number of the intake ports 2 of the engine 1 may be determined as appropriate. Passages 13, 14 may be defined in the manifold body 11 corresponding to the number of the intake ports 2. Furthermore, the passages 13, 14 defined in the manifold body 11 is not limited to the above structure, in which one passage 14 communicates with an intermediate portion of another passage 13. The passages 13, 14 may be defined by vertically or horizontally partitioning the intake passage Various modifications and alternations may be diversely made to the above embodiments without departing from the spirit of the present invention.

What is claimed is:

1. An intake manifold for an internal combustion engine including a first cylinder head and a second cylinder head each having at least one intake port, the first cylinder head and the second cylinder head defining a crank angle therebetween, the intake manifold comprising:

a manifold body that defines a plurality of intake passages each connecting with each of the at least one intake port, each of the plurality of intake passages having an interior divided into a plurality of divisional passages;

a butterfly valve that communicates and blocks at least one of the plurality of divisional passages;

a plurality of tanks that is formed integrally with the manifold body for accumulating negative pressure generated in the manifold body, the plurality of tanks including a first tank and a second tank, which are provided respectively to the first cylinder head and the second cylinder head; and an actuator that is applied with negative pressure from the plurality of tanks for operating the butterfly valve, wherein the manifold body has a communication passage that communicates the first tank with the second tank.

2. The intake manifold according to claim 1, wherein the internal combustion engine is a V-type engine, in which the first cylinder head is opposed to the second cylinder head, and the first cylinder head defines the bank angle with respect to the second cylinder head.

3. The intake manifold according to claim 1, wherein the manifold body includes a plurality of components that connects with each other via a boundary therebetween, and the boundary defines the communication passage.

4. The intake manifold according to claim 3, wherein the boundary is arranged between the plurality of intake passages, which is adjacent to each other.

5. An intake manifold according to claim 1,
wherein the at least one intake port of the first cylinder head includes a plurality of intake ports each connecting with each of the plurality of intake passages,
the first tank is partially arranged between the plurality of intake passages,
the at least one intake port of the second cylinder head includes a plurality of intake ports each connecting with each of the plurality of intake passages, and
the second tank is partially arranged between the plurality of intake passages.

6. An intake manifold for an internal combustion engine including a first cylinder head and a second cylinder head defining a crank angle therebetween, the first cylinder head and the second cylinder head each having at least one intake port, the intake manifold comprising:
a first member;
a second member that connects with the first member and partially defines a plurality of intake passages, each connecting with each intake port, therebetween,
wherein the first member and the second member define a first chamber, a second chamber, and a communication passage therebetween for accumulating negative pressure generated in the plurality of intake passages,
the first chamber and the second chamber are provided respectively to the first cylinder head and the second cylinder head,
the communication passage communicates a first tank with a second tank, and
the first tank and the second tank interpose the communication passage therebetween.

7. An intake manifold for an internal combustion engine including a first cylinder head and a second cylinder head each having at least one intake port, the first cylinder head and the second cylinder head defining a crank angle therebetween, the intake manifold comprising:
a manifold body that includes a first member and a second member connecting with each other and internally defining a plurality of intake passages each connecting with each intake port,
wherein the first member and the second member define a first chamber, a second chamber, and a communication passage therebetween for accumulating negative pressure generated in the plurality of intake passages,
the first chamber and the second chamber are provided respectively to the first cylinder head and the second cylinder head,
the communication passage communicates a first tank with a second tank, and
each of the plurality of intake passages having an interior divided into a plurality of divisional passages,
the intake manifold further comprising:
a butterfly valve that communicates and blocks at least one of the plurality of divisional passages; and
an actuator that is applied with negative pressure from the first chamber and the second chamber for operating the butterfly valve.

* * * * *